US010462322B2

(12) United States Patent
Gouch et al.

(10) Patent No.: US 10,462,322 B2
(45) Date of Patent: Oct. 29, 2019

(54) IMAGE SCANNING APPARATUS AND METHODS OF OPERATING AN IMAGE SCANNING APPARATUS

(71) Applicant: Ventana Medical Systems, Inc., Tucson, AZ (US)

(72) Inventors: Martin Philip Gouch, Hertfordshire (GB); William Roland Hawes, Hertfordshire (GB); Joachim Helmut Schmid, Santa Barbara, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 16/004,237

(22) Filed: Jun. 8, 2018

(65) Prior Publication Data
US 2018/0295254 A1 Oct. 11, 2018

Related U.S. Application Data

(63) Continuation of application No. PCT/EP2016/080360, filed on Dec. 9, 2016.

(60) Provisional application No. 62/265,015, filed on Dec. 9, 2015.

(51) Int. Cl.
*H04N 1/024* (2006.01)
*G02B 26/12* (2006.01)
*H04N 1/10* (2006.01)

(52) U.S. Cl.
CPC ....... *H04N 1/02409* (2013.01); *G02B 26/123* (2013.01); *G02B 26/128* (2013.01); *H04N 1/1043* (2013.01)

(58) Field of Classification Search
CPC ............ H04N 1/02409; H04N 1/1043; G02B 26/123; G02B 26/128
See application file for complete search history.

(56) References Cited

U.S. PATENT DOCUMENTS

| 7,485,834 | B2 * | 2/2009 | Gouch | G02B 7/38 250/201.2 |
| 7,702,181 | B2 * | 4/2010 | Gouch | G02B 21/241 345/629 |
| 9,575,308 | B2 * | 2/2017 | Dixon | G02B 21/26 |

(Continued)

FOREIGN PATENT DOCUMENTS

| JP | 9-15872 A | 1/1997 |
| WO | 2013017855 A1 | 2/2013 |

OTHER PUBLICATIONS

International Search Report and Written Opinion dated Apr. 5, 2017 in corresponding PCT/EP2016/080360 filed Dec. 9, 2016, pp. 1-9.

*Primary Examiner* — Kent Yip
(74) *Attorney, Agent, or Firm* — Kilpatrick Townsend & Stockton LLP

(57) ABSTRACT

Image scanning apparatus and method of operating an image scanning apparatus, the image scanning apparatus including a line scan detector and being configured to image a surface of an object mounted in the image scanning apparatus in a plurality of swathes, wherein each swathe is formed by a group of scan lines, each scan line being acquired using the scan line detector from a respective elongate region of the surface of the object extending in a scan width direction, wherein each group of scan lines is acquired whilst the object is moved relative to the scan line detector in a scan length direction.

20 Claims, 11 Drawing Sheets

(56) References Cited

U.S. PATENT DOCUMENTS 9,632,301 B2 * 4/2017 Damaskinos .......... B82Y 35/00
2005/0286800 A1 12/2005 Gouch

* cited by examiner

IMAGE SCANNING APPARATUS AND METHODS OF OPERATING AN IMAGE SCANNING APPARATUS

RELATED APPLICATIONS

This patent application is a continuation of International Patent Application No. PCT/EP2016/080360 filed Dec. 9, 2016, which claims priority to and the benefit of U.S. Provisional Patent Application No. 62/265,015, filed Dec. 9, 2015. Each of the above patent applications is incorporated herein by reference as if set forth in its entirety.

TECHNICAL FIELD

This disclosure relates to an image scanning apparatus and to methods of operating the same.

BACKGROUND

FIG. 1 illustrates a typical image scanning apparatus that provides a virtual microscope, which operates according to known principles.

The image scanning apparatus includes an imaging lens 1 which focuses light originating from a sample located on a slide 6 onto a line scan detector 2. The sample located on the slide 6 may be a biological specimen such as a tissue sample, for example.

As the detector 2 is a line scan detector, the image area is an elongate region 7 extending in a swathe width direction 5 (x-axis). The imaging lens 1 and the line scan detector 2 together make up an imaging system of the image scanning apparatus. The image scanning apparatus typically includes a slide mounting device configured to mount the slide 6 in the image scanning apparatus.

In order to produce an extended image over a large area of the sample located on the slide 6, the slide 6 is moved (by moving the slide mounting device) relative to the imaging lens 1 and line scan detector 2 in a scan length direction 8 (y-axis). In this sense the sample on the slide is "scanned" by the line scan detector 2.

In more detail, the image scanning apparatus is configured to image a surface of the sample located on the slide 6 in a plurality of swathes, wherein each swathe is formed by a group of scan lines, each scan line being acquired using the scan line detector 2 from a respective elongate region 7 of the surface of the sample extending in a scan width direction 5, wherein each group of scan lines is acquired whilst the slide 6 is moved relative to the scan line detector 2 in a scan length direction 8.

A focus setting of the image scanning apparatus may be adjusted, for example, by moving the imaging lens 1 along an imaging axis 9.

In a typical image scanning apparatus, an individual swathe acquired from the surface of the sample may be approximately 1 mm wide in the swathe width direction 5 and between 2 mm and 60 mm long in the swathe length direction 8. Multiple swathes can be combined to generate an image wider than the (approximately 1 mm) width of an individual swathe.

The present inventors observe that over the scale of 1 mm, the height variation of a typical biological sample (z-axis) does not typically exceed the depth of focus of the image scanning apparatus (typically in the region of 1 μm).

Further, the present inventors observe that during the acquisition of a swathe, a focus setting of the image scanning apparatus can be dynamically adjusted to maintain the sample in focus along the length of the sample in the scan length direction 8 (y-axis). Techniques for measuring and dynamically adjusting focus to maintain the sample in focus along the length of the sample in the scan length direction 8 are described in the literature, see, e.g., U.S. Pat. No. 7,485,834, WO2013/017855 and US2014/0071438.

Further, the present inventors have observed that it is not unknown for the height of a biological sample (z-axis) to vary more rapidly than the typical amount of 1 μm per mm discussed above. The present inventors have also observed that mechanical tolerances in typical image scanning apparatuses mean that the surface of the biological sample might be tilted (not parallel) in the scan width direction 5 relative to an imaging plane of the image scanning apparatus. For the scan length direction 8, this is not a problem because as described above the focus of the image scanning apparatus can be dynamically adjusted during the acquisition of a swathe. However, for the scan width direction 5, the possibility that the height of the biological sample might change more rapidly than the depth of focus of the image scanning apparatus across the width of a swathe is a problem, as it is not possible to dynamically adjust the focus so that the swathe is in focus across its width at one time.

The present disclosure has been devised in light of the above considerations.

SUMMARY

A first aspect of the disclosure may provide:

A method of operating an image scanning apparatus;
wherein the image scanning apparatus includes a line scan detector and is configured to image a surface of an object mounted in the image scanning apparatus in a plurality of swathes, wherein each swathe is formed by a group of scan lines, each scan line being acquired using the scan line detector from a respective elongate region of the surface of the object extending in a scan width direction, wherein each group of scan lines is acquired whilst the object is moved relative to the scan line detector in a scan length direction;
wherein the method includes:
using at least one scan line, acquired from a surface of a first object mounted in the image scanning apparatus using the scan line detector, to obtain at least one measure indicating that the surface of the first object is uneven (e.g. tilted) in the scan width direction relative to an imaging plane of the image scanning apparatus;
setting a swathe width value for use in acquiring at least one swathe from a surface of a second object mounted in the image scanning apparatus, wherein the swathe width value is set based on the at least one measure and configured so as to keep each swathe acquired from the surface of the second object substantially in focus across its width in the scan width direction;
acquiring at least one swathe from the surface of the second object using the scan line detector, wherein the at least one swathe acquired from the surface of the second object has a width in the scan width direction that corresponds to the swathe width value set based on the at least one measure.

Thus, advantageously, the at least one swathe acquired from the surface of the second object can be kept substantially in focus across its width in the scan width direction, even when the surface of the second object is uneven (e.g. tilted) in the scan width direction.

For the avoidance of any doubt, the second object may be the same object as the first object, e.g. a slide having a sample thereon (see e.g. FIG. 8). Alternatively, the second object may be a different object from the first object, e.g. the first object could be an internal target mounted in the image scanning apparatus and the second object could be a slide having a sample thereon (see e.g. FIG. 6 and FIG. 7).

An object may be moved relative to the scan line detector by moving the object whilst keeping the scan line detector static. However, for the avoidance of any doubt, an object may be moved relative to the scan line detector by moving the scan line detector whilst keeping the object static, or by moving both the object and the scan line detector.

A skilled person may appreciate that the at least one swathe acquired from the surface of the second object may contain very small localised regions in which the swathe is not in focus (e.g. due to local variations in the height of the surface of the object), even though the swathe width value was configured so as to keep that at least one swathe substantially in focus across its width.

An imaging plane of the image scanning apparatus may be defined as a plane from which an image acquired by the image scanning apparatus is deemed to be in focus. Such a plane can usually be defined for any imaging system.

The at least one measure may indicate that the surface of the first object is tilted in the scan width direction relative to an imaging plane of the image scanning apparatus.

The at least one measure may be calculated using the output of a focus merit function as calculated, for at least one scan line, at two or more positions offset from each other in the scan width direction.

The at least one measure may include at least one differential focus indicating a distance between (i) an in focus level at a first position on the surface of the first object; and (ii) an in focus level at a second position on the surface of the first object; wherein the first position and second position are offset from each other in the scan width direction.

The first position and second position offset from each other in the scan width direction preferably correspond to positions on opposite sides (e.g. opposite ends) of a scan line acquired from the surface of the first object mounted in the image scanning apparatus.

Each differential focus may be calculated using the output of a focus merit function as calculated, for at least one scan line, at two or more positions offset from each other in the scan width direction (see e.g. FIG. 3 which shows the output of a focus merit function as calculated at two positions for multiple scan lines obtained from a "focus sweep"; also see e.g. FIG. 4 which shows the output of a focus merit function as calculated at four positions for multiple scan lines obtained from a "focus sweep"; also see e.g. FIG. 11 which shows the output of a focus merit function as calculated at two positions for multiple scan lines in a swathe obtained using a dynamic focus tracking method).

A focus merit function may be configured to provide, for at least one scan line, an indication of focus quality at a given position, and may be calculated based on adjacent pixels at that given position. Such functions are well known in the art.

For the avoidance of any doubt, the at least one measure may include a single differential focus (see e.g. FIG. 3 to FIG. 5), or multiple differential focuses (see e.g. FIG. 11).

If the at least one measure includes multiple differential focuses, the multiple differential focuses may be combined (e.g. averaged) to provide a combined (e.g. averaged) differential focus, with the swathe width value being set based on the combined (e.g. averaged) differential focus.

In some embodiments (see e.g. FIG. 6), the at least one measure may be obtained and the swathe width value set based on the at least one measure prior to acquiring an image (including a plurality of swathes) from the surface of the second object, wherein each swathe acquired from the surface of the second object has a width in the scan width direction that corresponds to the swathe width value set based on the at least one measure.

In other embodiments (see e.g. FIG. 7), the at least one measure may be obtained and the swathe width value set based on the at least one measure prior to acquiring each swathe from the surface of the second object.

In yet other embodiments, the at least one measure may be obtained and the swathe width value set based on the at least one measure at periodic intervals, e.g. every 30 minutes.

If the second object is the same object as the first object, the method may include identifying one or more areas on the surface of the object suitable for acquiring the at least one scan line, and then subsequently acquiring at least one scan line from the one or more identified areas on the surface of the object (for subsequent use in obtaining the at least one measure).

If the method includes acquiring at least one scan line from the one or more identified areas on the surface of the object, then a respective measure indicating that the surface of the first object is uneven (e.g. tilted) in the scan width direction relative to an imaging plane of the image scanning apparatus may be acquired for each area on the surface of the object. These measures may then be combined (e.g. averaged) to provide a combined (e.g. averaged) measure, with the swathe width value being set based on the combined (e.g. averaged) measure (see e.g. FIG. 9).

Preferably, the method includes using a plurality of scan lines, acquired from the surface of the first object mounted in the image scanning apparatus using the scan line detector, to obtain the at least one measure.

In some embodiments, a plurality of scan lines (from which the at least one measure is obtained) may be acquired from a single elongate region of the surface of the first object extending in the scan width direction, with the image scanning apparatus having a different focus setting whilst each scan line is acquired (see e.g. FIG. 6-FIG. 9). The process of acquiring such scan lines may be referred to herein as a "focus sweep".

In some embodiments, a plurality of scan lines (from which the at least one measure is obtained) may be a group of scan lines forming a swathe, with each scan line being acquired from a respective elongate region of the surface of the first object extending in the scan width direction whilst the first object is moved relative to the scan line detector in the scan length direction (see e.g. FIG. 11-FIG. 16). The swathe formed by the group of scan lines (from which the at least one measure is obtained) may be a first swathe acquired from the surface of the object.

If a plurality of scan lines (from which the at least one measure is obtained) is a group of scan lines forming a swathe, the swathe may have been acquired using a dynamic focus tracking method in which the focus setting of the image scanning apparatus was adjusted whilst the swathe was acquired. Such dynamic focusing methods are disclosed in U.S. Pat. No. 7,485,834, WO2013/017855 and US2014/0071438, for example.

In some embodiments, the second object may be the same object as the first object, wherein a plurality of scan lines (from which the at least one measure is obtained) is a group of scan lines forming a swathe, the swathe having been acquired from the surface of the object using a dynamic focus tracking method in which the focus setting of the image scanning apparatus was adjusted whilst the swathe was acquired.

For example, each swathe subsequently acquired from the surface of the object may have a width in the scan width direction that corresponds to a swathe width value set based on the at least one measure obtained using the group of scan lines forming the swathe (see e.g. FIG. 12).

Alternatively, each time a new swathe is acquired from the surface of the object, scan lines forming the new swathe may be used to obtain the at least one measure, with the swathe width value being set based on the at least one measure so that the swathe width value is set each time a new swathe is acquired (see e.g. FIG. 13 and FIG. 14).

In some embodiments, if a swathe width value set based on a new swathe acquired from the surface of the object is smaller than a previously set swathe width value that was in use during the acquisition of the new swathe, then the width of the new swathe may be reduced based on the smaller swathe width value that has been set based on the new swathe (see e.g. FIG. 13 and FIG. 14)—this may be achieved, for example, by rescanning the corresponding region on the surface of the second object, or by reducing the width of the new swathe in post-processing.

In some embodiments, if a swathe width value set based on a new swathe acquired from the surface of the object is larger than a previously set swathe width value that was in use during the acquisition of the new swathe, then the width of the new swathe may be increased based on the larger swathe width value that has been set based on the new swathe (see e.g. FIG. 14)—this may be achieved, for example, by rescanning the corresponding region on the surface of the second object, or by increasing the width of the new swathe in post-processing, e.g. by saving the new swathe with a larger width in the swathe width direction, preferably with the additional width in the swathe width direction coming from a side of the swathe that does not adjoin a previously acquired swathe.

For the avoidance of any doubt, the at least one measure need not include a differential focus.

For example, the at least one measure may include the output of a focus merit function as calculated, for at least one scan line, at two or more positions offset from each other in the scan width direction.

In this case, the output of a focus merit function as calculated, for at least one scan line, at a centre position and two edge positions offset from each other in the scan width direction, could be used as measures indicating that the surface of a first object is tilted in the scan width direction relative to an imaging plane, without a differential focus being calculated. See e.g. FIG. 15, wherein if the edge values do not match each other to within a predetermined tolerance, or if the edge values do not match the centre value to within a predetermined tolerance, then these measures can be interpreted as indicating that surface of the first object is tilted in the scan width direction relative to an imaging plane of the image scanning apparatus. Also see e.g. FIG. 16, in which mean density values as calculated, for the at least one scan line, at the centre position and two edge positions are additionally used to ensure that the at least one scan line is suitable for assessing tilt.

In this case, the output of a focus merit function as calculated, for at least one scan line from a swathe acquired using the line scan detector, at a centre position ("centre merit value") and two edge positions ("edge merit values") offset from each other in the scan width direction, could be used as measures indicating that the surface of a first object is tilted in the scan width direction relative to an imaging plane. If the edge merit values do not match each other to within a predetermined tolerance or if the centre merit value does not match the edge merit values to within a predetermined tolerance, then these measures can be taken as indicating that the surface of a first object is tilted in the scan width direction relative to an imaging plane (see e.g. FIG. 15 and FIG. 16). Conversely, if the edge merit values match each other to within a predetermined tolerance and the centre merit value matches the edge merit values to within a predetermined tolerance, this could be taken as the centre and edge merit values indicating that the surface of a first object is not tilted in the scan width direction relative to an imaging plane. In this process, mean density values may also be calculated, for the at least one scan line, at the centre position and two edge positions, e.g. to ensure that the at least one scan line is suitable for assessing tilt (see e.g. FIG. 16).

The scan line detector may include a linear array of photodetectors.

Preferably, each swathe acquired from the surface of the second object is acquired by using all photodetectors in the linear array to obtain a precursor swathe from the surface of the second object, with the precursor swathe being post-processed (e.g. cropped) to obtain a swathe that has a width in the scan width direction that corresponds to the swathe width value set based on the at least one measure. This allows for the width of the swathe to be adjusted in post-processing, which may for example be useful to allow the width of the swathe to be increased in post-processing (see e.g. FIG. 14).

To allow the width of a swathe to be adjusted (e.g. increased) in post-processing, each precursor swathe from the surface of the second object is preferably acquired from a region (preferably a previously unscanned region) of the swathe that adjoins either an edge of the surface of the second object (which may be appropriate if the swathe is a first swathe) and/or adjoins a previously acquired swathe. This helps to provide the maximum scope for increasing the width of the swathe in post-processing on the non-adjoining side of the swathe, should that be needed/appropriate (see e.g. FIG. 14).

Alternatively, the at least one swathe acquired from the surface of the second object may be acquired using only a subset of photodetectors in the linear array so that the at least one swathe acquired from the surface of the second object has a width in the scan width direction that corresponds to the swathe width value set based on the at least one measure.

The swathe width value may be set based on the at least one measure and a depth of focus of the image scanning apparatus (i.e. not just the at least one measure). In this case, the at least one measure and the depth of focus of the image scanning apparatus may be used to set a swathe width value that is deemed to be a maximum useable swathe width for maximising the width of swathe acquired whilst keeping each swathe acquired from the surface of the second object substantially in focus across its width in the scan width direction.

However, for the avoidance of any doubt, the swathe width value may be set based on the at least one measure without reference to a depth of focus (see e.g. FIG. 15 and FIG. 16).

The second object may be a slide having a sample thereon. The sample may be a biological specimen. The surface of the second object (from which the at least one swathe is acquired) may be a surface of the sample (e.g. biological specimen) located on the slide.

The image scanning apparatus may include a mounting device configured to mount the second object in the image scanning apparatus. If the second object is a slide having a sample thereon (see above), the mounting device may be a slide mounting device configured to mount a slide in the image scanning apparatus.

If the first object is a different object from the second object, the first object may be a target mounted in the image scanning apparatus. In this case, the target mounted in the image scanning apparatus may be an "internal" target mounted in a mounting device that is separate from a mounting device used to mount the second object in the image scanning apparatus. However, it is also possible that the target could be an "external" target mounted in a mounting device that is subsequently used to mount the second object in the image scanning apparatus.

The target (if present) may be a square wave grating, for example.

If the image scanning apparatus includes a mount configured to mount the second object in the image scanning apparatus, the image scanning apparatus may be configured to move the second object relative to the scan line detector in a scan length direction by moving the mount in the scan length direction. The image scanning apparatus may be configured to move the second object relative to the scan line detector in a scan length direction by moving the line scan detector (in addition to or as an alternative to moving the mount).

The image scanning apparatus may include an imagine system including the line scan detector and an imaging lens. A focus setting of the image scanning apparatus may be adjusted, for example, by moving the imaging lens, though other ways of adjusting a focus setting of the image scanning apparatus would be apparent to those skilled in the art.

A second aspect of the disclosure may provide an image scanning apparatus configured to perform a method according to the first aspect of the disclosure.

The apparatus may be configured to implement, or have means for implementing, any method step described in connection with any above aspect of the disclosure.

The image scanning apparatus may include a control unit, e.g. a computer, configured to control the image scanning apparatus to perform a method according to the first aspect of the disclosure.

A third aspect of the disclosure may provide a computer-readable medium having computer-executable instructions configured to cause an image scanning apparatus to perform a method according to the first aspect of the disclosure.

The disclosure also includes any combination of the aspects and preferred features described except where such a combination is clearly impermissible or expressly avoided.

BRIEF DESCRIPTION OF THE DRAWINGS

Examples of these proposals are discussed below, with reference to the accompanying drawings in which.

DETAILED DESCRIPTION

Figure 1:
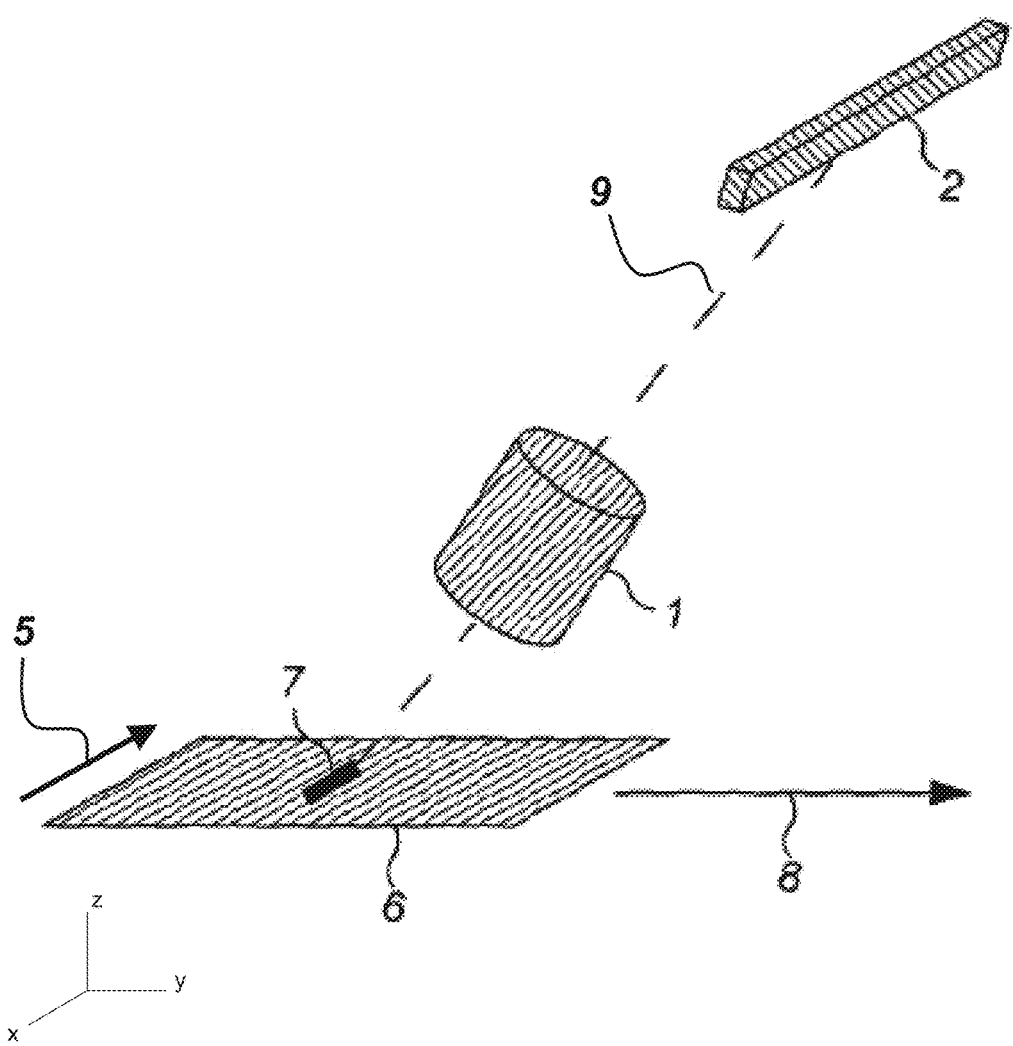
FIG. 1 illustrates a typical image scanning apparatus that provides a virtual microscope, which operates according to known principles.

With reference to FIG. 1, there are a number of factors which may cause the height of a sample on a slide 7 to change more rapidly than the depth of focus of an image scanning apparatus (typically in the region of 1 μm) over the width of a swathe acquired by the image scanning apparatus (typically in the region of 1 mm).

These factors include but are not limited to:
1. Temperature variations within the image scanning apparatus causing the side mount to tilt or the optics to tilt.
2. The slide itself has a side to side wedge.
3. The slide is not sitting fully on the slide mount.
4. The sample (e.g. tissue slice) is wedged.
5. There has been differential wear on opposite sides of the slide mount.
6. The alignment of the system is not perfect.

Figure 2:
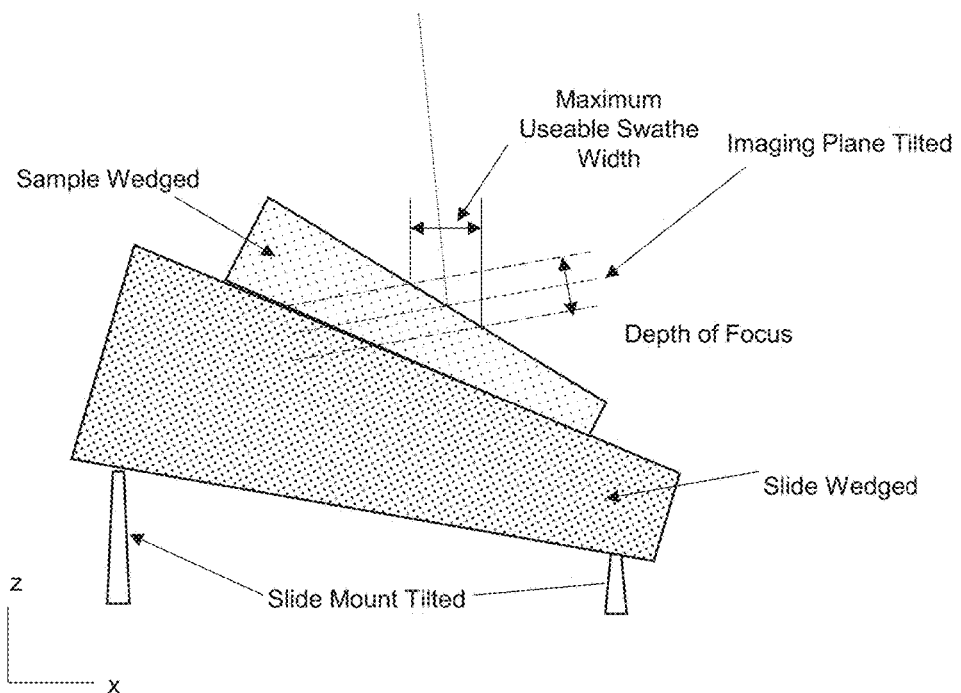
FIG. 2 illustrates factors which may cause the height of a sample on a slide to change more rapidly than the depth of focus of an image scanning apparatus over the width of a swathe acquired by the image scanning apparatus.

These factors are demonstrated in FIG. 2, with sources of error exaggerated for clarity purposes.

In general, the following discussion describes examples of our proposals that provide a variable swathe width, in the context of operating an image scanning apparatus that includes a line scan detector.

This concept can be understood with reference to FIG. 2, which shows the limit of swathe width where the surface of a sample on a slide is kept within the depth of focus, referred to as a "maximum useable swathe width". The maximum useable swathe width may be defined as the maximum width of a swathe that is able to keep the surface of the sample in focus across the width of the swathe in the scan width direction.

If areas outside this maximum useable swathe width are used, the resulting image will be out of focus and not fit for purpose.

The present inventors have observed that if the swathe width is set to the maximum useable swathe width, rather than the maximum possible swathe width, this will allow the whole of the sample to be scanned in focus. In particular, for an image scanning apparatus with zero or low tilt, a sample on a slide can be scanned in the minimum number of swathes using swathes that have the maximum possible swathe width, which in turn gives the shortest scan time. For an image scanning apparatus with significant tilt, then it is still possible to scan the slide without loss of image quality by reducing the swathe width. For example, for an image scanning apparatus having a 1 µm depth of focus and a sample having a tilt of 2 µm across the swathe width, then an in focus swathe could still be acquired by reducing the width of the swathe scanned to half the normal swathe width. This will produce the same image quality as a scanner with no tilt but because of the greater number swathes required for the same scan area the time to scan will increase.

To set the swathe width to a maximum useable swathe width or the maximum possible swathe width, a maximum useable swathe width should first be determined. To determine a maximum useable swathe width, a differential focus may be calculated. A differential focus may be defined as being indicative of a distance between (i) an in focus level at a first position on the surface of the sample; and (ii) an in focus level at a second position on the surface of the sample; wherein the first position and second position are offset from each other in the scan width direction 5. The first and second positions may correspond to positions on opposite sides (e.g. opposite ends) of a scan line or group of scan lines.

A differential focus may be measured by performing a "focus sweep" on a single line location 7 on the sample. A focus sweep can be thought of as a 2D image in the xz plane rather than the xy plane. This can be achieved with a simply by moving the lens focus along the z axis, e.g. by moving the lens 1 along the imaging axis 9, while the line scan detector 2 is collecting data, or by performing consecutive single line scans at different focus positions. From scan lines acquired in the focus sweep (as an image or stack of images), it is possible to calculate the output of a focus merit function at two positions that are on either side of the line location 7, as a function of focus position (z-axis). A peak in a merit function indicates an "in focus" level. Hence, the difference between the peaks of the output of the merit function for the two positions that are on either side of the line location 7, provides a differential focus, which is indicative of a distance between in focus levels at the two positions.

The output of a focus merit function can be thought of as providing a measure of the quality of focus and there are many functions that may be used, typically based on a difference in adjacent pixels. An example of this is in FIG. 3 where the output of the focus merit function on each side of the swathe has a peak at a different focus position (z-axis). The fact that the output of the focus merit function has different peak values at the two positions is not important and only shows that the sample measured has different level of detail at those two positions (i.e. across the swathe width). It is the difference in the in focus position that provides the differential focus. For the example shown in FIG. 3, the differential focus is shown in FIG. 3 in arbitrary units ("AU") derived from the position of the imaging lens 1 along the imaging axis, though other measures of focus position could equally be used.

Figure 3:
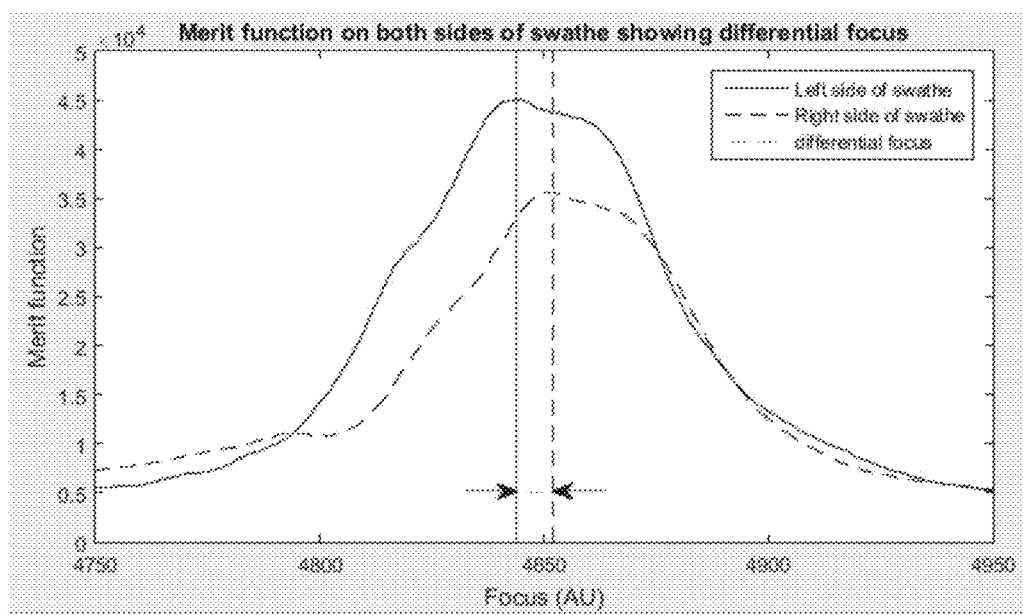
FIG. 3 shows the output of a focus merit function calculated using adjacent pixels at positions at either end of line scans obtained from a focus sweep.

In the example of FIG. 3, the output of the focus merit function is calculated using adjacent pixels at positions at either end of the line scans obtained from the focus sweep (left edge, right edge).

If the differential focus is measured over the maximum possible swathe width then a maximum usable swathe width may be determined as the lesser of the maximum possible swathe width or the depth of focus multiplied by the maximum possible swathe width divided by the differential focus. This could be represented by as follows:

$$MU = \text{lesser of}(\alpha * dof * Mp/\Delta f) \text{ or } Mp$$

where, MU=Maximum useable swathe width, dof=Depth of Focus, Mp=Maximum possible swathe width, $\Delta f$=Differential Focus, and $\alpha$=scaling factor to permit variability in the tilt (typically this factor would be close to 1).

It is also possible to use multiple points across the swathe width and fit a straight line or a curve to the peak values. This can be seen in FIG. 4 and FIG. 5.

Figure 4:
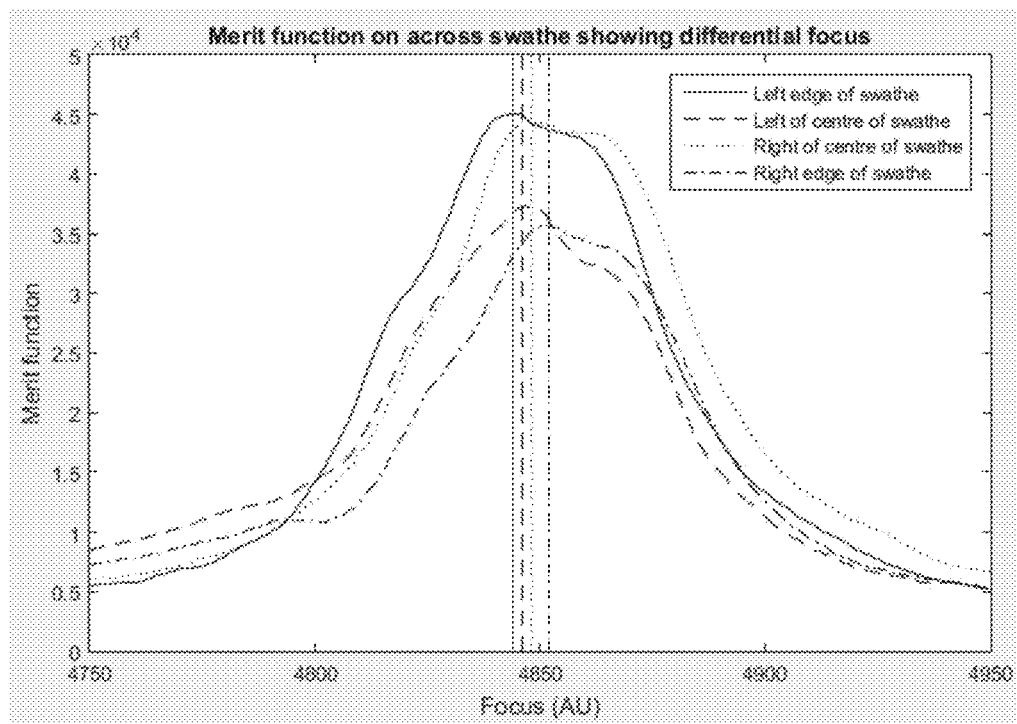
FIG. 4 shows the output of a focus merit function calculated using adjacent pixels at positions at either end of line scans obtained from a focus sweep, and intermediate positions between either end of the line scans and a centre of the line scans.

In the example of FIG. 4, the focus merit function is calculated using adjacent pixels at either side of the line scans (left edge, right edge) and also at intermediate positions between either end of the line scans and a centre of the line scans (left of centre, right of centre).

If it is only required to compensate for changes or errors in the image scanning apparatus and not the slide 7 or sample itself, then a known target may be used to determine a maximum useable swathe width, rather than direct measurement from a sample on the slide 7. Typically this target would be square wave grating mounted in the scanner separately from a mount used for slides, e.g. so that the target could be moved into and out from the imaging axis 9. Types of target other than a square wave grating could be used. Also, a target not permanently mounted within the scanner but instead mountable in a mount used for slides could be used. The same technique for measuring differential focus can be used on the target, as has already been described above. It is also not required for the target to be mounted without any tilt as if the level of tilt of the target relative to a mounted slide is known this can be subtracted from the measured tilt of the target to give the real tilt of a mounted slide. In this way, we can either measure the tilt of a slide directly, or measure the change in tilt of a target to give the tilt of a slide.

From a knowledge of the depth of focus it is then possible to define a maximum usable swathe width and set the swathe width of the scanner to maintain image quality.

Whilst the swathe width is preferably set to be equal to a maximum useable swathe width is preferred, the swathe width may instead be calculated with a buffer to be slightly smaller than the maximum useable swathe width to ensure that the distance between the in focus levels at the edges of a swathe does not exceed the depth of focus of the image scanning apparatus. In either case, the swathe width is set based on at least one measure (differential focus) indicating that the surface of the sample on the slide is uneven (in this case tilted) in the scan width direction relative to an imaging plane of the image scanning apparatus.

Figure 6:
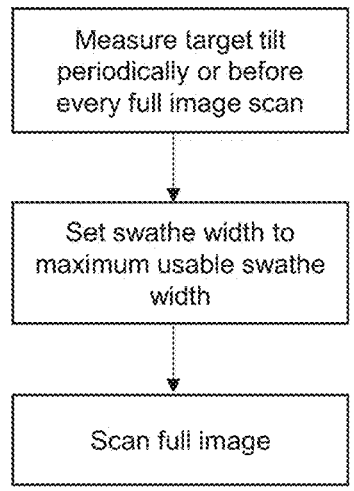
FIG. 6 shows an example workflow in which a tilt measurement is performed before every full image scan.
Figure 7:
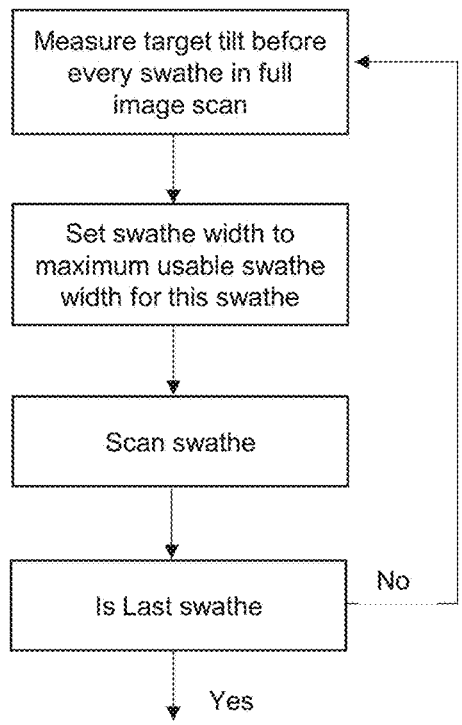
FIG. 7 shows an example workflow in which a tilt measurement is performed before acquisition of every swathe in an image scan.

This measurement of the tilt of a mounted slide can be performed periodically, typically every 30 mins if the change in the scanner is slow. If the change in tilt is more rapid, a tilt measurement can be performed before every full image scan, as in the workflow shown in FIG. 6. It is also possible for a tilt measurement to be performed before acquisition of every swathe in an image scan if the change is very rapid. This sequence is shown in FIG. 7. If tilt is measured before every swathe this may give an image with different swathe widths within the full scanned image.

Figure 8:
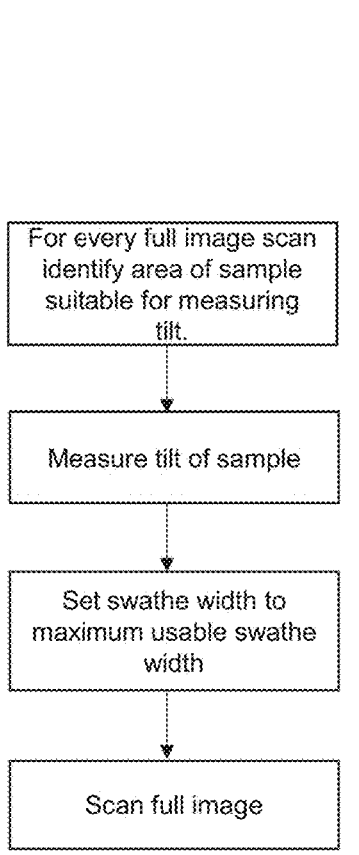
FIG. 8 shows an example workflow in which a suitable area within the surface of a sample is identified and measured before every full scanned image.

If the sample, slide and a slide mount is to be compensated for, then it is necessary to scan the sample itself (i.e. necessary for the object used for measuring tilt to be the same as the object being scanned). A suitable area within the surface of the sample, with detail across a swathe width, can be identified and measured before every full scanned image. A maximum usable swathe width for the full scanned image can then be set. This is shown in FIG. 8.

Figure 9:
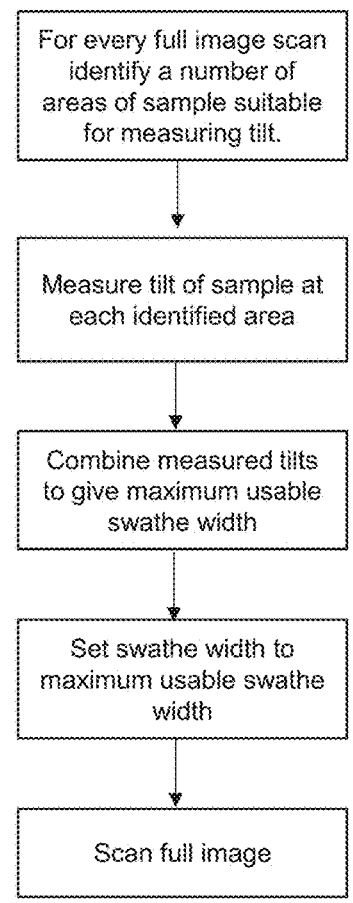
FIG. 9 shows an example workflow in which multiple suitable areas within the surface of a sample is identified and measured before every full scanned image.

The thickness of a tissue sample may vary across the sample and a single measurement may not give a reliable measurement. However if measurements are taken at multiple points on the tissue sample, these can be combined to give a more reliable result. The combination process may be a simple mean or median value or maximum value or a more sophisticated process designed to remove the outlying results such as taking the mean of 80% of the closest results. Such combination processes are well known to those skilled in the art. This is shown in FIG. 9

Taking many measurements from the surface of a sample on each slide 7 may be time consuming and could reduce the productivity.

However, it is already known to perform a focus sweep at a single point in predetermined area of a sample prior to imaging the sample in order to establish a single focus level at which to start scanning (note, this known process only involves determining a single in focus level, rather than calculating a differential focus). By using this conventional focus sweep to additionally calculate differential focus values, it would be possible for trends to be predicted for many scans or slides. For example, if the image scanning apparatus has drifted in tilt, this will show as a similar differential focus in all slides, and if many slides are analysed with measurements over a determined time period, e.g. by averaging, then the degree of tilt can be reliably measured and the swathe width adjusted. This only requires a single focus sweep on each slide or full sample image, as is already done regularly in practice to establish a single focus level at which to start scanning.

Figure 10:
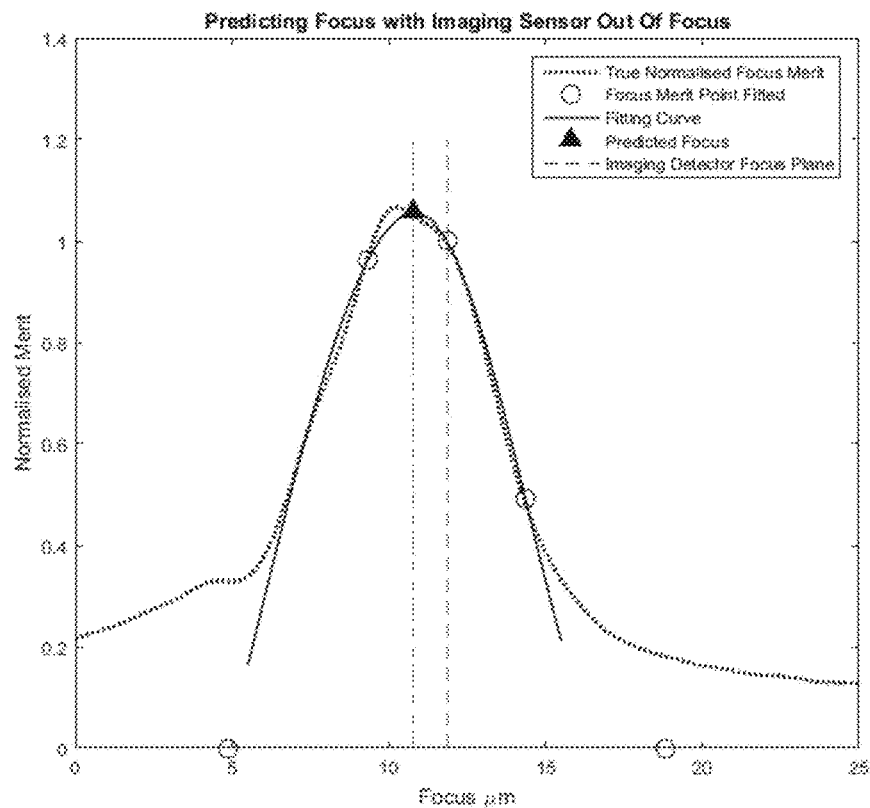
FIG. 10 shows how a dynamic focus tracking system may be used to predict a single focus position at which to scan at a given location along the length of a swathe.

If the scanner has a dynamic focus tracking system such as described in US2014/0071438 or WO2013/017855 or U.S. Pat. No. 7,485,834 it is possible to measure/predict the differential focus during the scanning of a swathe. In these documents the whole of the swathe width is used to predict a single focus position at which to scan at a given location along the length of a swathe, as shown in FIG. 10.

Figure 11:
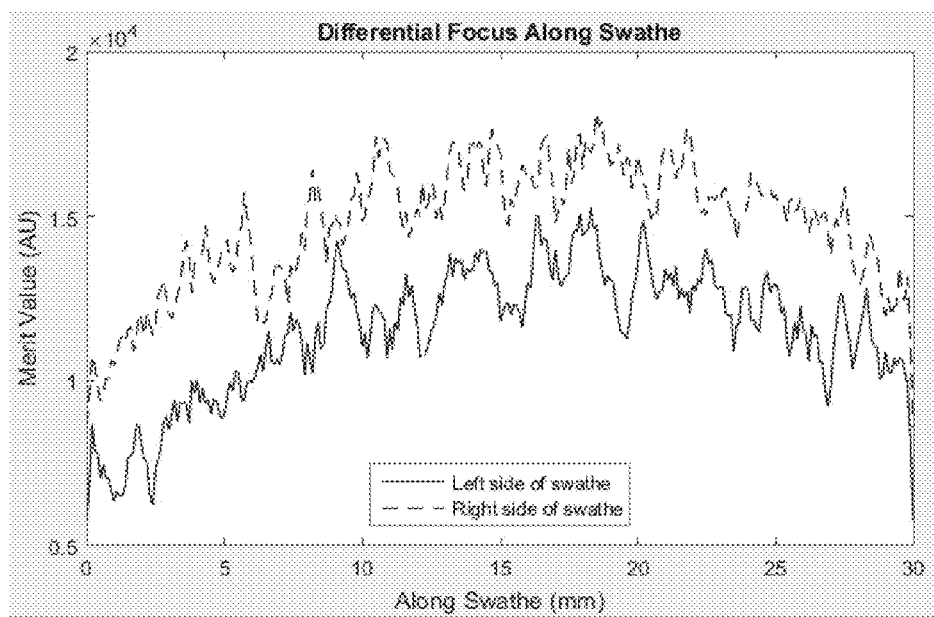
FIG. 11 shows how differential focus values could be obtained for multiple positions along the full length of a swathe, using a dynamic focus tracking system.

These dynamic focusing tracking techniques could be modified to calculate focus merit functions on either side of scan lines from a swathe to determine in focus positions, thereby allowing differential focus values to be obtained for multiple positions along the full length of a swathe, as shown in FIG. 11. The multiple differential focus values obtained at multiple positions along the full length of the swathe can be combined to produce a single differential focus value to set a maximum usable swathe width. The combination process may be a simple mean or median value or maximum value or a more sophisticated process designed to remove the outlying results such as taking the mean of 80% of the closest results. Such combination processes are well known to those skilled in the art.

Figure 12:
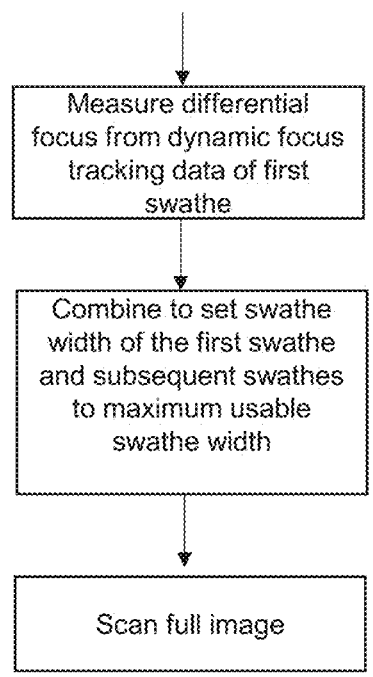
FIG. 12 shows an example workflow in which the differential focus can be measured from dynamic focus tracking data using a first swathe to set the swathe width for subsequent swathes of a full image scan.

This measuring of the differential focus can be measured from dynamic focus tracking data using a first swathe to set the swathe width for all subsequent swathes of a full image scan as shown in FIG. 12.

Figure 13:
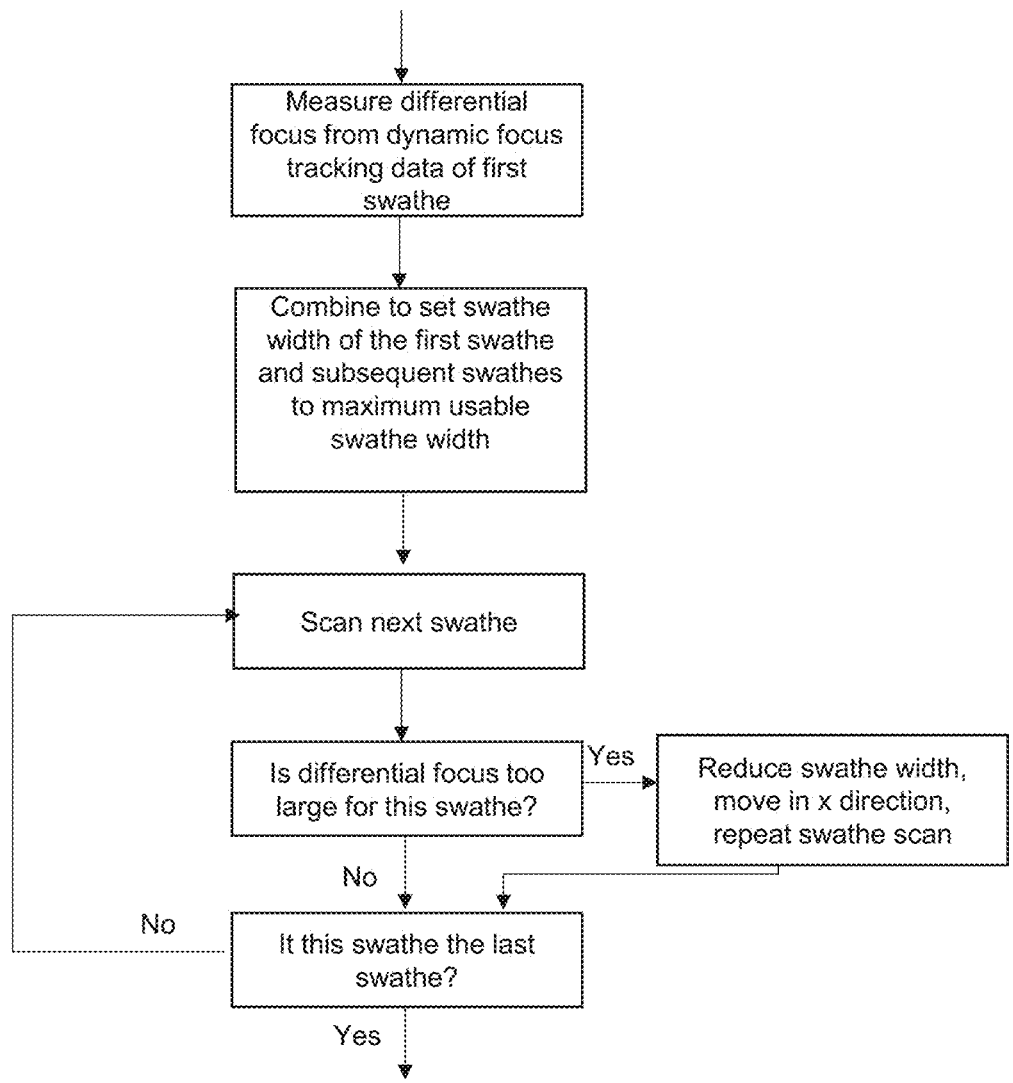
FIG. 13 shows the example workflow of FIG. 12, modified to allow the swathe width to be reduced if any individual swathe has a differential focus that is too large.

If on subsequent swathes the differential focus error is monitored from the dynamic focus tracking data it can be analysed if any individual swathe has a differential focus that is too large. If so, the swathe can be repeated but with a reduced swathe width, as shown in FIG. 13. Note that in this case it is required to repeat the swathe scan as the centre of the swathe scan has to be moved along the x direction to ensure that the swathe width adjoins the previous adjacent swathe. This means different swathes within the same full scan image will have different widths. At the end of the reduced width swathe the swathe for the subsequent swathes may be returned to the swathe width calculated after the first swathe or may be retain at the reduced swathe width.

Figure 14:
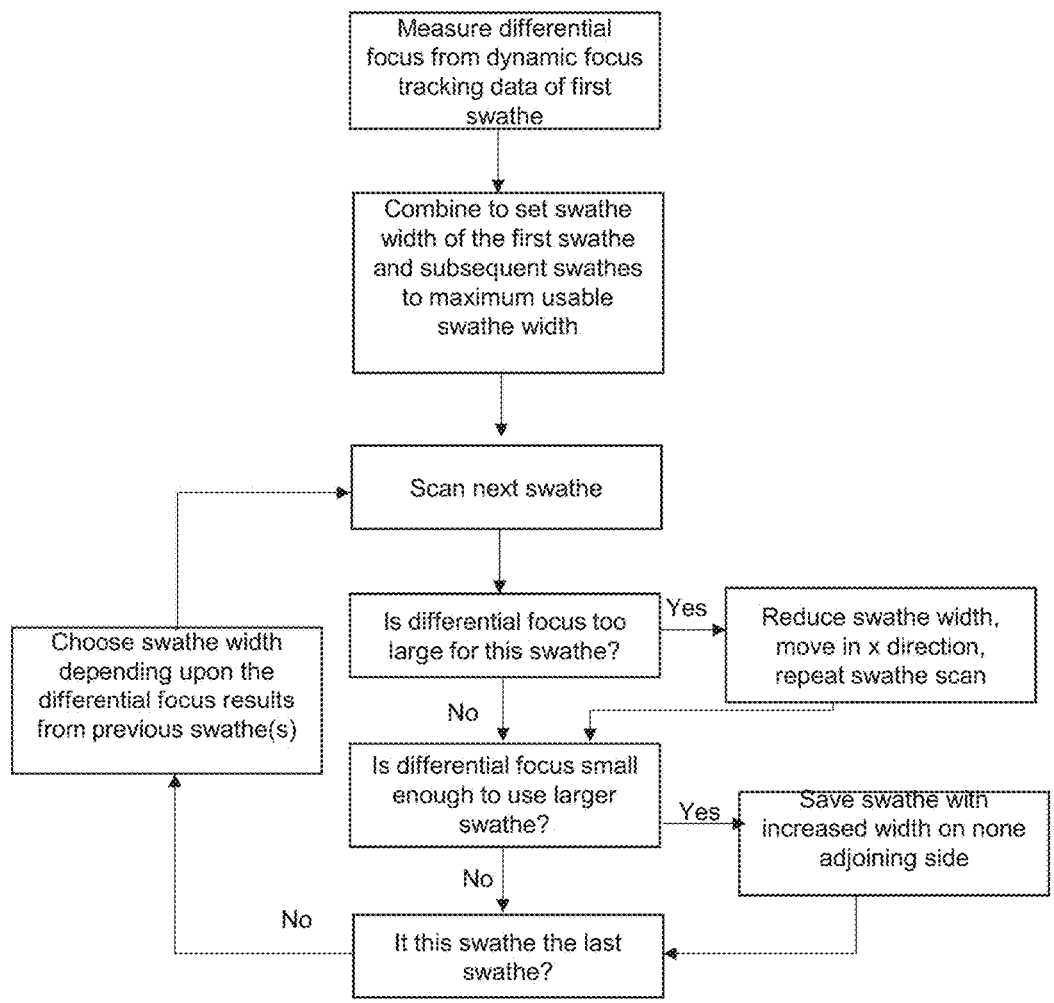
FIG. 14 shows the example workflow of FIG. 13, modified to allow the swathe width to be increased if any individual swathe has a differential focus indicating that the swathe width could have been greater.

If the differential focus data from a swathe indicates the swathe width could have been greater than that used it is possible to use the addition swathe image data on the side not adjoining a previous scanned swathe, as shown in FIG. 14. It would then be possible to scan subsequent swathes at the larger swathe width.

Again, trends can be predicted by using the focus tracking data for every swathe for many scans or slides. If the scanner has drifted in tilt this will show as an error in all slides and if many slides are analysed with measurements such as averaging the degree of tilt can be reliably measured and the maximum usable swathe width adjusted accordingly.

Figure 5:
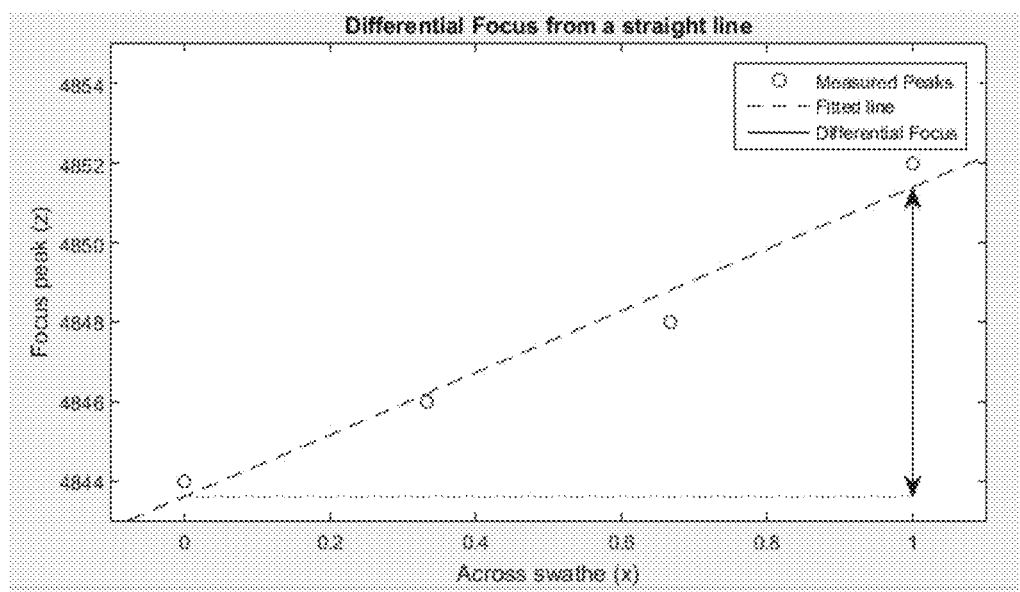
FIG. 5 shows how differential focus may be calculated from the outputs illustrated in FIG. 4.

The example workflows shown in FIG. 11-FIG. 14 use only two positions on either side of a swathe to calculate the output of the focus merit function, but it is possible to use more positions across the swathe to calculate the output of the focus merit functions and predict the differential focus in the same way as shown in FIG. 5.

If there is no dynamic focus data available then measures indicating that the surface of a sample on a slide is uneven (e.g. tilted) in the scan width direction relative to an imaging plane of the image scanning apparatus can still be estimated from a scanned swathe image itself. This can be done using multiple scan lines from a swathe (as shown below), or even from just a single scan line from a swathe (not shown).

For example, a focus merit value (output of a focus merit function) could be calculated at positions on both sides and the middle of a swathe, and if the detail in the sample is known to be uniform across the swathe, then the relative values of the edge merit values can be compared with the centre merit value to assess whether the sample on the slide 7 is tilted, and adjust the swathe width accordingly.

Figure 15:
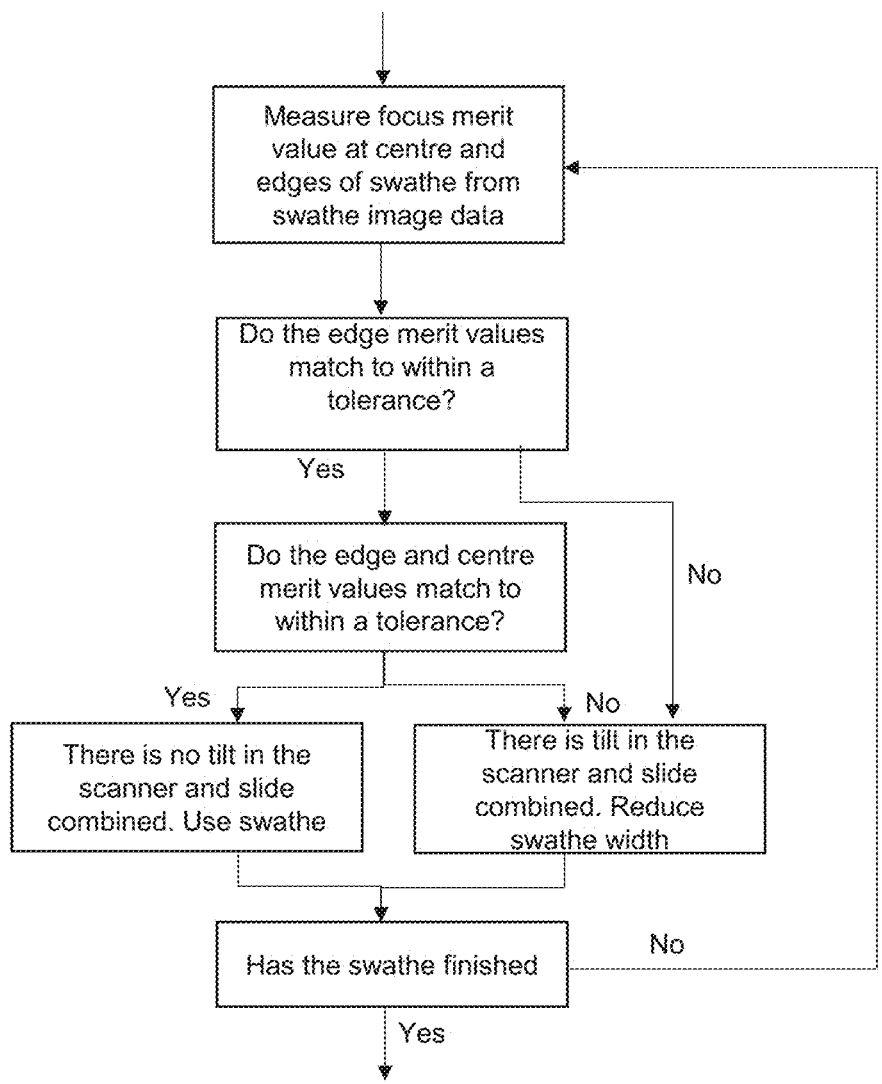
FIG. 15 shows an example workflow in which a focus merit value is calculated at positions on both sides and the middle of a swathe to assess tilt.

In particular, if the sample is uniform in detail the two edge merit values will match. If the sample is uniform and has no tilt the two edge merit values will match and the centre merit value will match. If the sample is uniform and has tilt the edge merit values will match but be lower than the centre merit value. This is shown in FIG. 15. From all of these decisions we can determine if there the swathe width was too wide by deciding if there were too many decisions where there was judged to be tilt in the system. The swathe width can then be reduced and repeated if required.

The amount of reduction of swathe width could be determined from monitoring additional points across the swathe width such as third, quarter, eighth or more points. These can then have the same logic as shown in FIG. 15 applied and the widest set of points which meet the acceptability criteria on the number of "No" decisions can be used to set the maximum usable swathe width.

Figure 16:
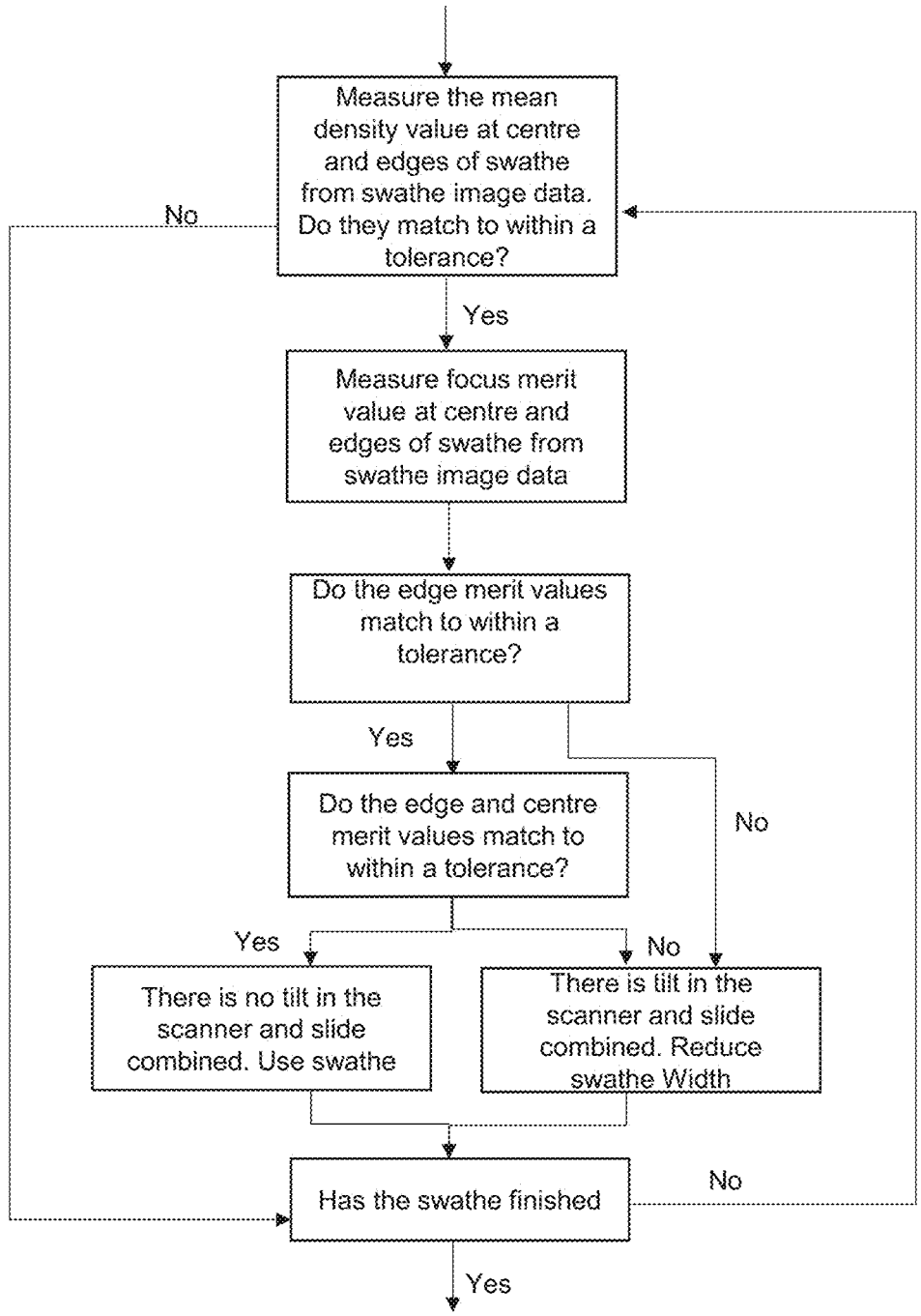
FIG. 16 shows the example workflow of FIG. 15, modified to additionally calculate mean density values at the positions on both sides and the middle of a swathe.

A further refinement is shown in FIG. 16. Here, the mean density value of each section of the swathe can be measured. If the sample is uniform in detail the mean density value of each section of the swathe will be similar. If the mean density value of each section of the swathe is not the same then the detail will not be uniform even if the merit values of each section are the same. This provides a check to make sure that the scan line is suitable for measuring tilt, since if mean density values are different, then the scan line can't be used to assess tilt. The amount of reduction of the swathe width required can be calculated in the same way with more sections across the swathe width using not only the focus merit values but the mean density being matched to the other sections.

As in the example workflows where the differential focus is used to alter the swathe width, such as those shown in FIG. 12 to FIG. 14, we can use the focus merit data to adjust the swathe width to the maximum usable swathe width.

In addition a maximum usable swathe width measurement determined according to the example workflows shown in FIG. 15 and FIG. 16 can be used to predict trends. For example if the maximum usable swathe width reduces over a period of time, then a user could be informed to call someone to perform corrective action such as a visit from a service engineer. Predictive trends can inform the user that corrective action will be required in a certain time interval before the maximum usable swathe width is actually required to be reduced and impact the scanner productivity.

For those skilled in the art it can be seen that various combinations of the example workflows set out above could be used.

When used in this specification and claims, the terms "comprises" and "comprising", "including" and variations thereof mean that the specified features, steps or integers are included. The terms are not to be interpreted to exclude the possibility of other features, steps or integers being present.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the disclosure in diverse forms thereof.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Various changes to the described embodiments may be made without departing from the spirit and scope of the disclosure.

For the avoidance of any doubt, any theoretical explanations provided herein are provided for the purposes of improving the understanding of a reader. The inventors do not wish to be bound by any of these theoretical explanations.

All references referred to above are hereby incorporated by reference.

The following statements provide general expressions of the disclosure herein:

A. When necessary to reduce the swathe width to maintain the image quality
B. Measuring the focus position at two locations across the swathe to determine the differential focus in a focus sweep scan or focus stack.
C. Measuring the focus position at more than two locations across the swathe in a focus sweep scan or focus stack to determine the differential focus by combining the multiple location data.
D. Measuring the differential focus from an internal target and setting the swathe width to the maximum usable swathe width.
E. Measuring the differential focus from an external target and setting the swathe width to the maximum usable swathe width.
F. Measuring the differential focus from a suitable area of the sample and setting the swathe width to the maximum usable swathe width.
G. Measuring the differential focus from a suitable area of the sample before every full image scan and setting the swathe width to the maximum usable swathe width.
H. Measuring the differential focus from a number of suitable areas of the sample before every full image scan and setting the swathe width to the maximum usable swathe width.
I. Measuring the differential focus of the sample from the dynamic focus tracking data of the first swathe at a number of points along the swathe and setting the swathe width of the full image scan to the maximum usable swathe width of the first swathe.
J. Measuring the differential focus of the sample from the dynamic focus tracking data of the first swathe at a number of points along the swathe and setting the swathe width of the full image scan to the maximum usable swathe width of the first swathe. Subsequent swaths are also measured and if the maximum usable swathe width is smaller repeat the swathe with a smaller swathe width.
K. Measuring the differential focus of the sample from the dynamic focus tracking data of the first swathe at a number of points along the swathe and setting the swathe width of the full image scan to the maximum usable swathe width of the first swathe. Subsequent swaths are also measured and if the maximum usable swathe width is smaller repeat the swathe with a smaller swathe width. If the maximum usable swathe width is larger than the swathe width used then save the additional swathe image data on the side of the swathe that is not adjoining any previous swathe.
L. Measure the focus merit values of the scanned swathe image at the edge of the swathe and the centre. When the edge merit values match to within a tolerance and the centre merit values match to within a tolerance accept the swathe. When the edge merit values match and the centre merit values are improved then reduce the swathe width.
M. The amount of swathe width reduction in step L can be calculated from measuring the focus merit values at multiple locations across the swathe and using the largest swathe width where the centre and side values all match to within a tolerance.
N. Using steps L with M and setting the swathe width of the full image scan to the maximum usable swathe width of the first swathe.
O. Using steps L with M and setting the swathe width of the full image scan to the maximum usable swathe width of the first swathe. Subsequent swaths are also measured and if the maximum usable swathe width is smaller repeat the swathe with a smaller swathe width.
P. Using steps L with M and setting the swathe width of the full image scan to the maximum usable swathe width of the first swathe. Subsequent swaths are also measured and if the maximum usable swathe width is smaller repeat the swathe with a smaller swathe width. If the maximum usable swathe width is larger than the swathe width used then save the additional swathe image data on the side of the swathe that is not adjoining any previous swathe.

Q. Measure the focus merit values of the scanned swathe image and the density at the edge of the swathe and the centre. When the edge merit values and the density values match to within a tolerance and the centre merit and density values match to within a tolerance accept the swathe. When all the density values match to within a tolerance, the edge merit values match and the centre merit values are improved then reduce the swathe width.

R. The amount of swathe width reduction in step Q can be calculated from measuring the focus merit values at multiple locations across the swathe and using the largest swathe width where the centre and side values all match to within a tolerance.

S. Using steps Q with R and setting the swathe width of the full image scan to the maximum usable swathe width of the first swathe.

T. Using steps Q with R and setting the swathe width of the full image scan to the maximum usable swathe width of the first swathe. Subsequent swaths are also measured and if the maximum usable swathe width is smaller repeat the swathe with a smaller swathe width.

U. Using steps Q with R and setting the swathe width of the full image scan to the maximum usable swathe width of the first swathe. Subsequent swaths are also measured and if the maximum usable swathe width is smaller repeat the swathe with a smaller swathe width. If the maximum usable swathe width is larger than the swathe width used then save the additional swathe image data on the side of the swathe that is not adjoining any previous swathe.

The invention claimed is:

1. A method of operating an image scanning apparatus; wherein the image scanning apparatus includes a line scan detector and is configured to image a surface of an object mounted in the image scanning apparatus in a plurality of swathes, wherein each swathe is formed by a group of scan lines, each scan line being acquired using the scan line detector from a respective elongate region of the surface of the object extending in a scan width direction, wherein each group of scan lines is acquired whilst the object is moved relative to the scan line detector in a scan length direction;
wherein the method includes:
using at least one scan line, acquired from a surface of a first object mounted in the image scanning apparatus using the scan line detector, to obtain at least one measure indicating that the surface of the first object is uneven or tilted in the scan width direction relative to an imaging plane of the image scanning apparatus,
setting a swathe width value for use in acquiring at least one swathe from a surface of a second object mounted in the image scanning apparatus, wherein the swathe width value is set based on the at least one measure and configured so as to keep each swathe acquired from the surface of the second object substantially in focus across its width in the scan width direction, and
acquiring at least one swathe from the surface of the second object using the scan line detector, wherein the at least one swathe acquired from the surface of the second object has a width in the scan width direction that corresponds to the swathe width value set based on the at least one measure.

2. The method of claim 1, wherein the second object is the same object as the first object.

3. The method of claim 1, wherein the at least one measure is calculated using the output of a focus merit function as calculated, for at least one scan line, at two or more positions offset from each other in the scan width direction.

4. The method of claim 1, wherein the at least one measure includes at least one differential focus indicating a distance between (i) an in focus level at a first position on the surface of the first object; and (ii) an in focus level at a second position on the surface of the first object; wherein the first position and second position are offset from each other in the scan width direction.

5. The method of claim 4, wherein the at least one differential focus is calculated using the output of a focus merit function as calculated, for at least one scan line, at two or more positions offset from each other in the scan width direction.

6. The method of claim 4, wherein the at least one measure includes multiple differential focuses, and the multiple differential focuses are combined to provide a combined differential focus, with the swathe width value being set based on the combined differential focus.

7. The method of claim 1, wherein the second object is the same object as the first object, and the method includes identifying one or more areas on the surface of the object suitable for acquiring the at least one scan line, and then subsequently acquiring at least one scan line from the one or more identified areas on the surface of the object.

8. The method of claim 1, wherein a plurality of scan lines, from which the at least one measure is obtained, is acquired from a single elongate region of the surface of the first object extending in the scan width direction, with the image scanning apparatus having a different focus setting whilst each scan line is acquired.

9. The method of claim 1, wherein a plurality of scan lines, from which the at least one measure is obtained, is a group of scan lines forming a swathe, with each scan line being acquired from a respective elongate region of the surface of the first object extending in the scan width direction whilst the first object is moved relative to the scan line detector in the scan length direction.

10. The method of claim 1, wherein the second object is the same object as the first object, wherein a plurality of scan lines, from which the at least one measure is obtained, is a group of scan lines forming a swathe, the swathe having been acquired from the surface of the object using a dynamic focus tracking method in which the focus setting of the image scanning apparatus was adjusted whilst the swathe was acquired.

11. The method of claim 10, wherein each time a new swathe is acquired from the surface of the object, scan lines forming the new swathe are used to obtain the at least one measure, with the swathe width value being set based on the at least one measure so that the swathe width value is set each time a new swathe is acquired.

12. The method of claim 1, wherein if a swathe width value set based on a new swathe acquired from the surface of the object is smaller than a previously set swathe width value that was in use during the acquisition of the new swathe, then the width of the new swathe is reduced based on the smaller swathe width value that has been set based on the new swathe.

13. The method of claim 1, wherein if a swathe width value set based on a new swathe acquired from the surface of the object is larger than a previously set swathe width value that was in use during the acquisition of the new swathe, then the width of the new swathe is increased based on the larger swathe width value that has been set based on the new swathe.

14. The method of claim 1, wherein the at least one measure includes the output of a focus merit function as calculated, for at least one scan line, at two or more positions offset from each other in the scan width direction.

15. The method of claim 1, wherein the scan line detector includes a linear array of photodetectors.

16. The method of claim 1, wherein the swathe width value is set based on the at least one measure and a depth of focus of the image scanning apparatus, wherein the at least one measure and the depth of focus are used to set a swathe width value that is deemed to be a maximum useable swathe width for maximising the width of swathe acquired whilst keeping each swathe acquired from the surface of the second object substantially in focus across its width in the scan width direction.

17. The method of claim 1, wherein the second object is a slide having a sample thereon, wherein the sample is a biological specimen.

18. The method of claim 1, wherein the first object is a different object from the second object, and the first object is a target mounted in the image scanning apparatus.

19. An image scanning apparatus comprising a line scan detector and configured to:
  image a surface of an object mounted in the image scanning apparatus in a plurality of swathes, wherein each swathe is formed by a group of scan lines, each scan line being acquired using the scan line detector from a respective elongate region of the surface of the object extending in a scan width direction, wherein each group of scan lines is acquired whilst the object is moved relative to the scan line detector in a scan length direction;
  use at least one scan line, acquired from a surface of a first object mounted in the image scanning apparatus using the scan line detector, to obtain at least one measure indicating that the surface of the first object is uneven in the scan width direction relative to an imaging plane of the image scanning apparatus;
  set a swathe width value for use in acquiring at least one swathe from a surface of a second object mounted in the image scanning apparatus, wherein the swathe width value is set based on the at least one measure and configured so as to keep each swathe acquired from the surface of the second object substantially in focus across its width in the scan width direction;
  acquire at least one swathe from the surface of the second object using the scan line detector, wherein the at least one swathe acquired from the surface of the second object has a width in the scan width direction that corresponds to the swathe width value set based on the at least one measure.

20. A non-transitory computer-readable medium having computer-executable instructions which, when executed by one or more processors, cause an image scanning apparatus to perform a method;
  wherein the image scanning apparatus includes a line scan detector and is configured to image a surface of an object mounted in the image scanning apparatus in a plurality of swathes, wherein each swathe is formed by a group of scan lines, each scan line being acquired using the scan line detector from a respective elongate region of the surface of the object extending in a scan width direction, wherein each group of scan lines is acquired whilst the object is moved relative to the scan line detector in a scan length direction; and
  wherein the method includes:
  using at least one scan line, acquired from a surface of a first object mounted in the image scanning apparatus using the scan line detector, to obtain at least one measure indicating that the surface of the first object is uneven or tilted in the scan width direction relative to an imaging plane of the image scanning apparatus,
  setting a swathe width value for use in acquiring at least one swathe from a surface of a second object mounted in the image scanning apparatus, wherein the swathe width value is set based on the at least one measure and configured so as to keep each swathe acquired from the surface of the second object substantially in focus across its width in the scan width direction, and
  acquiring at least one swathe from the surface of the second object using the scan line detector, wherein the at least one swathe acquired from the surface of the second object has a width in the scan width direction that corresponds to the swathe width value set based on the at least one measure.

\* \* \* \* \*